Jan. 6, 1931.  F. GERSBACHER  1,787,819
TUB SUPPORTING ATTACHMENT FOR WASHING MACHINES
Filed Oct. 7, 1929  2 Sheets-Sheet 1
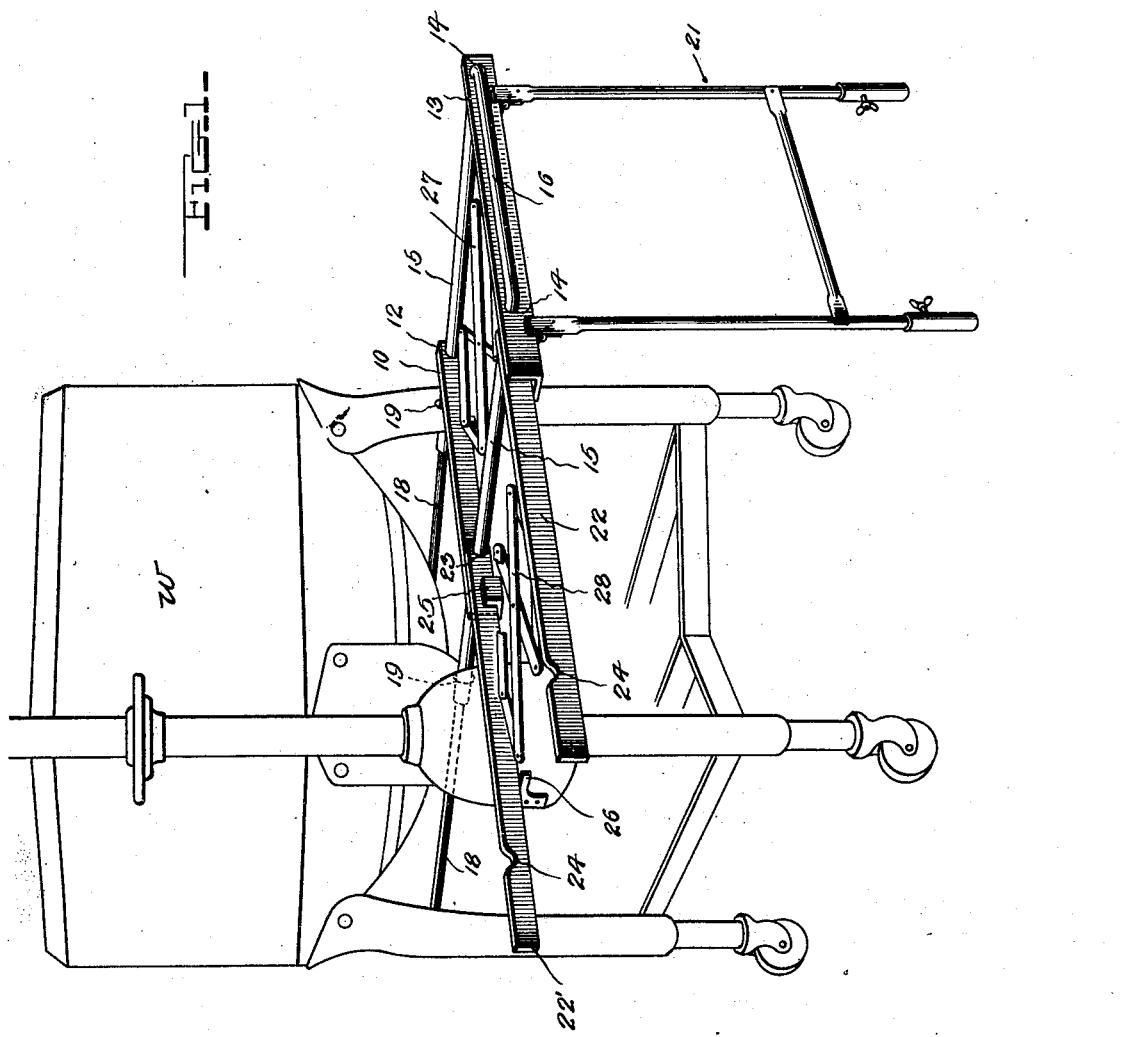
Witness
J. R. Pirce.
Inventor
F. Gersbacher.
By H. R. Willson & Co.
Attorneys

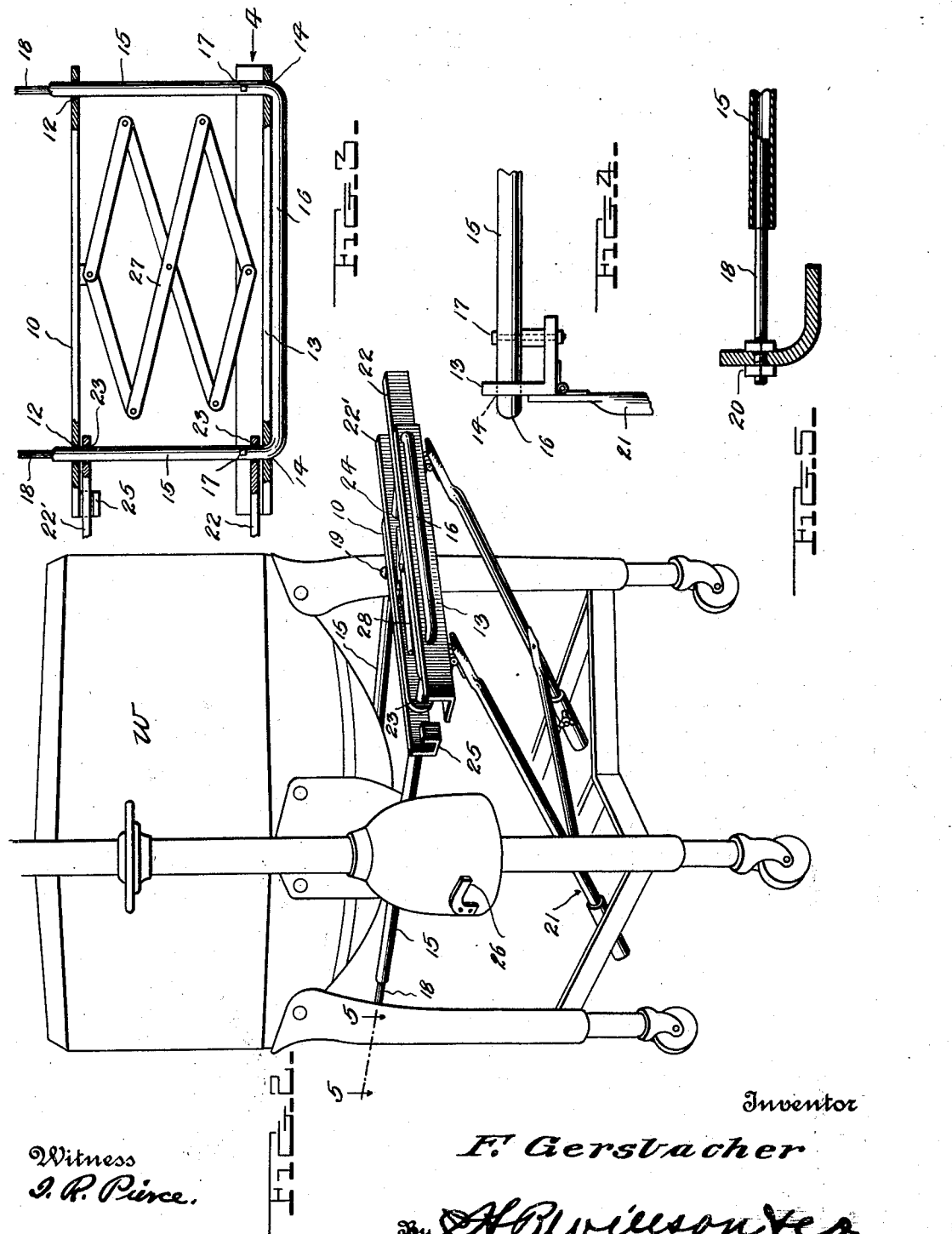

Patented Jan. 6, 1931

1,787,819

UNITED STATES PATENT OFFICE

FRANK GERSBACHER, OF CHRISTOPHER, ILLINOIS

TUB-SUPPORTING ATTACHMENT FOR WASHING MACHINES

Application filed October 7, 1929. Serial No. 398,055.

The invention aims to provide a rather simple and inexpensive, yet an efficient and desirable attachment for washing machines, adapted when extended to support one or more tubs or baskets, but capable of being moved inwardly to a position at which it is entirely out of the way when not in use.

With the foregoing in view, the invention resides in the novel subject matter hereinafter described and claimed, description being accomplished by reference to the accompanying drawing.

Fig. 1 is a perspective view with the attachment extended for use.

Fig. 2 is a similar view with the attachment retracted.

Fig. 3 is a fragmentary top plan partly broken away and in section.

Fig. 4 is a detail elevation as indicated by the arrow 4 of Fig. 3.

Fig. 5 is a detail horizontal section on line 5—5 of Fig. 2.

In the drawings above briefly described, the numeral 10 denotes a horizontal bar preferably formed of strap iron and adapted to be disposed broadside to a washing machine W, said bar having openings 12 near its ends. At the outer side of the bar 10, and parallel therewith, is a second bar 13 preferably formed of angle metal with one vertical and one horizontal flange, the ends of this bar being formed with openings 14 alined with the openings 12. A pipe is bent into U-shape to provide two parallel arms 15 which pass through the alined openings 14–12, the outer ends of said arms being connected by the intermediate pipe portion 16 which lies at the outer side of the bar 13. This bar is secured to the pipe by bolts or other desired fasteners 17. The arms 15 surround a pair of horizontal guide rods 18 which project beyond the inner ends of said arms. These rods pass through openings 19 in the legs or other portions of the washer W and are appropriately secured to the latter as indicated at 20. The openings 19, near the bar 10, also receive the inner ends of the arms 15, so that upon inward pushing of the bar 13, it may move into close relation with the bar 10. When the device is in use however, the bar 13 occupies a position outwardly spaced to quite an extent from the bar 10, being then supported by a hinged leg structure 21 which may be vertically extensible if the washer legs be of this nature. The leg structure 21 is inwardly and upwardly swingable as shown in Fig. 2 when the tub support is to be moved to its out of the way position.

Two extension bars 22—22' are each pivoted at one end as denoted at 23 upon one of the arms 15 and when the device is not in use, they fold inwardly between the bars 10–13 and lie upon the other arm 15, being notched at 24 to receive the latter. When desired, the bars 22—22' may be swung beyond the ends of the bars 10 and 13 as shown in Fig. 1. In this position, bar 22 rests solidly upon the horizontal flange of the bar 13 and bar 22' engages a rigid hook 25 on the bar 10, holding the bars 22—22' against sagging. If desired, a suitable support 26 may also be secured on a part of the washer W to underlie the bar 22' when it is extended.

A lazy-tong structure 27 preferably extends between the bars 10 and 13 and a similar structure 28 extends between the bars 22—22', these two structures being pivoted to appropriate lugs on said bars.

To support only one tube or basket, the device may be used with the bars 22—22' folded inwardly between the bars 10 and 13. To support two tubs or baskets, however, the bars 22—22' are outwardly swung to the position shown in Fig. 1. Regardless of the position of these bars, the attachment may be extended to any desired degree from the washer W. When the use of the attachment is no longer necessary, the leg structure 21 is upwardly swung, and with the bars 22—22' folded between the bars 10 and 13, the entire attachment is inwardly slid as shown in Fig. 2, occupying a position at which it will be entirely out of the way.

On account of the existing advantages for the general construction disclosed, it is preferably followed. However, within the scope of the invention as claimed, variations may be made.

I claim:—

1. A tub-supporting attachment for a washing machine, comprising a horizontal bar adapted to be disposed at the exterior of the machine, said bar having longitudinally spaced openings, a second horizontal bar parallel with the first named bar and disposed at the outer side thereof, two parallel horizontal arms secured to said second bar and disposed at right angles thereto, said arms passing slidably through said openings and allowing inward and outward shifting of said second bar, and a foldable supporting leg for this bar.

2. A structure as specified in claim 1; said arms being tubular, and horizontal guide rods surrounded by and projecting from the inner ends of said tubular arms, said rods being adapted for attachment to the washing machine.

3. A structure as specified in claim 1; together with a pair of extension bars pivoted upon one of said arms and adapted to swing outwardly beyond one end of the first and second named bars, and means for supporting said extension bars in projected position.

4. A tub-supporting attachment for a washing machine, comprising a horizontal bar adapted to be disposed at the exterior of the machine, said bar having longitudinally spaced openings, a second horizontal bar parallel with the first named bar and disposed at the outer side thereof, said second bar having openings alined with the first named openings, a pipe bent into U-shape and having its arms passed through said openings of both bars, said pipe being secured to the second named bar and having its arm-connecting portion disposed at the outer side thereof, and two guide rods surrounded by and projecting from the inner ends of said arms, the projecting ends of said rods being adapted for attachment to the washing machine.

5. A tub-supporting attachment for a washing machine, comprising an inner horizontal bar for disposition at the exterior of the machine, an outer horizontal bar parallel with and horizontally spaced from said inner bar, inner and outer horizontal extension bars connected with the first named inner and outer bars respectively and adapted for projection and retraction with respect thereto, parallel arms secured to and projecting inwardly from the first named outer bar, said arms having sliding connections with the first named inner bar to allow relative movement of all of said bars toward and from each other, and means for supporting the first named outer bar when moved outwardly from the first named inner bar.

6. A structure as specified in claim 5; together with horizontal lazytong linkage connected with the first named inner and outer bars, and additional horizontal lazytong linkage connected with said inner and outer extension bars.

In testimony whereof I have hereunto affixed my signature.

FRANK GERSBACHER.